US009507690B2

(12) United States Patent
Mangold et al.

(10) Patent No.: US 9,507,690 B2
(45) Date of Patent: Nov. 29, 2016

(54) METHOD AND DEVICE FOR ANALYZING AN EXECUTION OF A PREDETERMINED PROGRAM FLOW ON A PHYSICAL COMPUTER SYSTEM (75) Inventors: Florian Mangold, Ismaning (DE); Harald Rölle, München (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 719 days.

(21) Appl. No.: 13/059,379

(22) PCT Filed: Jul. 21, 2009

(86) PCT No.: PCT/EP2009/059340
§ 371 (c)(1),
(2), (4) Date: Apr. 5, 2011

(87) PCT Pub. No.: WO2010/025993
PCT Pub. Date: Mar. 11, 2010

(65) Prior Publication Data
US 2011/0184716 A1    Jul. 28, 2011

(30) Foreign Application Priority Data

Sep. 5, 2008    (DE) .................. 10 2008 046 018

(51) Int. Cl.
*G06F 9/45*    (2006.01)
*G06F 11/36*    (2006.01)
(52) U.S. Cl.
CPC ................. *G06F 11/3612* (2013.01)

(58) Field of Classification Search
CPC .................. G06F 17/50; G06F 17/5009; G06F 11/3612
(Continued)

(56) References Cited

U.S. PATENT DOCUMENTS 7,908,020 B2 *  3/2011  Pieronek .......................... 700/19
8,239,836 B1 *  8/2012  Franz et al. .................. 717/127
(Continued)

OTHER PUBLICATIONS

Dr. Mikael Bergqvist, NPL, "Debugging Multicore software using virtual hardware", May 30, 2008.*
(Continued)

*Primary Examiner* — Hugh Jones
(74) *Attorney, Agent, or Firm* — Slayden Grubert Beard PLLC (57) ABSTRACT The functionality of simulated, virtual hardware units is varied during the execution of a program flow on the virtual hardware units, for example via an interface device of a simulation device, in such a manner that the execution behavior changes of a program flow can be identified by using at least one faulty, physical hardware unit. A method and a device are used for analyzing an execution of a predetermined program flow on a physical computer system. The method and the device are used to determine execution behavior changes of software products which changes are due to faulty hardware components. The method and device allow execution behavior changes to be identified systematically, using an operating system and eliminates the need for expensive, physical hardware components and for modifications to a physical computer system.

22 Claims, 4 Drawing Sheets (58) Field of Classification Search
 USPC .......................................................... 703/22
 See application file for complete search history.

(56) References Cited

U.S. PATENT DOCUMENTS

| | | | | |
|---|---|---|---|---|
| 8,315,382 | B2* | 11/2012 | Fischer ............................ | 380/43 |
| 8,352,240 | B2* | 1/2013 | Chow et al. .................... | 703/26 |
| 2005/0035966 | A1* | 2/2005 | Pasquarette et al. ......... | 345/440 |
| 2005/0071126 | A1* | 3/2005 | Groz ............................. | 702/186 |
| 2006/0041417 | A1* | 2/2006 | Palladino ........................ | 703/14 |
| 2006/0052997 | A1* | 3/2006 | Burns et al. .................... | 703/22 |
| 2007/0126749 | A1* | 6/2007 | Tzruya et al. ................. | 345/581 |
| 2010/0325485 | A1* | 12/2010 | Kamath et al. ................. | 714/15 |

OTHER PUBLICATIONS

ECU Testing, NPL, "ECU Testing with dSPACE Simulator," 2005.*
Bergqvist, M., "Debugging Multicore Software Using Virtual Hardware", Power.org, 43 pages, May 30, 2008.
German Office Action, German application No. 102008046018.4-53, 6 pages, Apr. 27, 2010.
"ECU Testing with dSPACE Simulator", Catalog dSPACE, pp. 74-98, Jan. 1, 2005.
Space Product Assurance. Failure Modes, Effects (and Criticality) Analysis (FEMA/FMECA), European Cooperation for Space Standardization, 63 pages, Apr. 30, 2008.
International PCT Search Report and Written Opinion, PCT/EP2009/059340, 15 pages, Nov. 16, 2009.

\* cited by examiner

METHOD AND DEVICE FOR ANALYZING AN EXECUTION OF A PREDETERMINED PROGRAM FLOW ON A PHYSICAL COMPUTER SYSTEM

CROSS-REFERENCE TO RELATED APPLICATIONS

This application is a U.S. National Stage Application of International Application No. PCT/EP2009/059340 filed Jul. 21, 2009, which designates the United States of America, and claims priority to DE Application No. 10 2008 046 018.4 filed Sep. 5, 2008. The contents of which are hereby incorporated by reference in their entirety.

TECHNICAL FIELD

The present invention relates to a method for analyzing an execution of a predetermined program flow on a physical computer system which has a plurality of interacting physical hardware units. The invention further relates to a computer installation which is suitable for performing the method, and to a computer program product that performs a corresponding method for analyzing the program flow.

BACKGROUND

Testing is one of the components of the development process for software units. As part of this activity, tests determine whether software units correspond to a predetermined specification, for example. This is frequently an iterative process, wherein after each test of the relevant software unit any non-compliances that have been identified in relation to the specification can be remedied. Particularly in the case of safety-critical software products, the possibility must be considered that parts of the computer system on which the software is executed are faulty. A fault in a hardware unit ranges from sporadic malfunction to total failure. Using corresponding tests, it is possible to assess a behavior change in a software product, wherein said behavior change was caused by a fault in a hardware unit.

One approach for assessing effects of faulty hardware units on the execution behavior of a program flow is the utilization of software-based test codes. In this context, a test code is created which explicitly simulates the behavior changes when executing a program flow using a faulty hardware unit. In the case of the module test, for example, this is implemented by means of stubs. In the module test, individual modules are validated in respect of their functionality before they are integrated, in order then to perform the subsequent tests of a test hierarchy (e.g. integration test, system test). In this context, integration refers to the incorporation of individual software modules in an existing modularly structured software system, and to the integration of individual hardware modules into an existing computer system. In this context, a stub is a separate software module which replaces parts of other software modules, parts of libraries, or parts of the operating system. In order to test behavior in the event of hardware faults, the stubs are implemented in such a way that they replicate the behavior of other submodules in the event of a fault in a hardware unit.

A physical hardware unit is e.g. a fixed disk. In order to test a fixed disk fault, for example, operating system calls are replaced by calling the stubs that are responsible for reading and writing data. Instead of executing the functionality of the operating system, a stub will merely return an error code or an error report to the calling program flow. The stub merely replaces the extended functionality of the tested module here, while other parts of the software system use the correctly functioning operating system call as usual. This has the disadvantage that stubs can only test individual modules with regard to their behavior relative to faulty hardware units. The development cost of implementing the aforementioned stubs is also disadvantageous. It is also not possible to test the overall system as a whole by means of software-based test code. In particular, software-based test code cannot include the operating system of the physical computer system in the test of the hardware units.

A further known approach consists in replacing the correctly functioning hardware unit with an explicitly faulty hardware unit during the test. Real faulty hardware units which are utilized in precisely these test cases must be varied in respect of a predetermined functionality, such that the predetermined fault is simulated. This is disadvantageous in particular because the current market for hardware units is characterized by great diversity. Consequently, a hardware unit that is varied according to the predetermined fault would have to be provided for each physical hardware unit that is to be tested. Furthermore, when simulating a plurality of faulty hardware units, it would be necessary to simulate all combinations of the potentially faulty hardware units. In this context, however, the software system can only be validated in respect of precisely those faults for which the corresponding faulty hardware is available. Moreover, the validation in respect of suddenly occurring faults is not possible using this method. A fault which occurs during the execution of the program flow, or which occurs temporarily, cannot be simulated however.

SUMMARY

According to various embodiments, an improved method for analyzing an execution of a predetermined program flow on a computer system can be provided.

According to an embodiment, a method for analyzing an execution of a predetermined program flow on a physical computer system which has a plurality of interacting physical hardware units, may comprise the following steps:—replicating a functionality of a physical hardware unit as functionality of a virtual hardware unit in order to develop at least part of a virtual computer system which corresponds to the physical computer system;—executing the program flow a first time using the replicated functionality of the virtual hardware unit, and monitoring a first execution behavior of the program flow;—executing the program flow a second time using a varied functionality of the virtual hardware unit, and monitoring a second execution behavior of the program flow; and—comparing the first execution behavior with the second execution behavior in order to identify an execution behavior change.

According to a further embodiment, a further step can be performed: varying the functionality of the virtual hardware unit. According to a further embodiment, the program flow can be changed in order to counterbalance the identified execution behavior change. According to a further embodiment, the functionality of the physical hardware unit can be changed in order to counterbalance the identified execution behavior change when executing the program flow using the physical hardware unit. According to a further embodiment, the program flow and/or the functionality of the physical hardware unit can be changed such that the first execution behavior and the second execution behavior are identical. According to a further embodiment, an execution behavior can be described by a temporal sequence of parameter assignments which are initiated by the execution of the program flow. According to a further embodiment, an execution behavior can be described by a temporal sequence of execution states in individual execution steps of the predetermined program flow, wherein a respective execution state is not-terminated, terminated or cancelled, wherein the execution state is not-terminated during the execution of the program flow, is terminated after execution of the program flow, and is cancelled in the case of an unpredictable cancellation of the execution of the program flow. According to a further embodiment, an execution behavior can be described by a temporal sequence of performance indicators relating to the execution of individual execution steps of the predetermined program flow. According to a further embodiment, the replication of the functionality of the physical hardware unit, the first execution of the program flow and monitoring of the execution behavior, the second execution of the program flow and monitoring of the execution behavior, and/or the comparison of the monitored execution behaviors can be executed at least to some extent in parallel relative to time. According to a further embodiment, the replication of the functionality of the physical hardware unit may comprise virtualization. According to a further embodiment, the replication of the functionality of the physical hardware unit may comprise emulation. According to a further embodiment, the varying of the functionality of the virtual hardware unit can be done by means of an interface entity of the virtual computer system. According to a further embodiment, the replication of the functionality of the physical hardware unit may involve enhancing a hypervisor to include an interface entity for varying the functionality of the virtual hardware unit. According to a further embodiment, the varying of a functionality of a first virtual hardware unit may take place depending on a functionality of a second virtual hardware unit. According to a further embodiment, the monitoring of the execution behavior of the predetermined program flow may comprise capturing, measuring, estimating, logging and/or storing parameter assignments, execution states and/or performance indicators. According to a further embodiment, the predetermined program flow may comprise a test routine, algorithm, software program, instruction sequence and/or program routine.

According to another embodiment, a computer installation for analyzing an execution of a predetermined program flow using a physical hardware unit which interacts with at least one further physical hardware unit as a physical computer system, may comprise a control entity for replicating the functionality of the physical hardware unit as a functionality of a virtual hardware unit, for varying a functionality of the virtual hardware unit, for monitoring an execution behavior, and for comparing the execution behaviors.

According to a further embodiment of the computer installation, the control entity may be suitable for counterbalancing an execution behavior change which was identified by comparing the execution behaviors. According to a further embodiment of the computer installation, the control entity may comprise: at least one replicating entity for replicating the functionality of the physical hardware unit, at least one execution entity for executing the predetermined program flow using the functionality of the virtual hardware unit, at least one variation entity for varying the functionality of the virtual hardware unit during the program flow, at least one monitoring entity for monitoring the execution behavior, at least one comparison entity for comparing the execution behaviors and/or at least one counterbalancing entity for counterbalancing the execution behavior change. According to a further embodiment of the computer installation, the computer installation may be configured such that a method as described above is executed. According to a further embodiment of the computer installation, the replicating entity or the control entity can be embodied as a hypervisor in which an interface entity is provided for varying the functionality of the virtual hardware unit. According to a further embodiment of the computer installation, the variation entity may vary the functionality of the virtual hardware unit via the interface entity during the execution of the program flow. According to a further embodiment of the computer installation, the replicating entity, the execution entity, the variation entity, the monitoring entity and the comparison entity can be implemented at least partially as a computer program.

According to yet another embodiment, a computer program product may perform a method as described above on a computer installation as described above.

BRIEF DESCRIPTION OF THE DRAWINGS

The invention is explained in greater detail below on the basis of exemplary implementations and with reference to the appended figures, in which.

Identical or functionally identical elements in the figures are identified by the same reference signs unless otherwise specified.

DETAILED DESCRIPTION

Accordingly, a method is provided for analyzing an execution of a predetermined program flow on a physical computer system which has a plurality of interacting physical hardware units. For this purpose, a functionality of a physical hardware unit is replicated as a functionality of a virtual hardware unit, in order to develop at least part of a virtual computer system which corresponds to the physical computer system. Furthermore, provision is made for a first execution of the program flow, using the replicated functionality of the virtual hardware unit, and for monitoring a first execution behavior of the program flow. Provision is then made for a second execution of the program flow, using a varied functionality of the virtual hardware unit, and for monitoring a second execution behavior of the program flow. The first execution behavior is then compared with the second execution behavior, and an execution behavior change is identified thus.

Replicating the functionality of the physical hardware unit is understood to mean providing and operating a functionality of a virtual hardware unit in accordance with the functionality of the corresponding physical hardware unit.

When executing the program flow, the individual execution steps of the program flow are processed by a computing unit, for example. A computing unit can be embodied as a processor, microprocessor, computer, computer system, CPU (central processing unit), arithmetic computing unit or circuit, for example. A program flow can be a software component, for example, which is executed using a physical hardware unit that offers a faulty functionality. A program flow can comprise a test routine, an algorithm, a software program, an instruction sequence and/or a program routine, for example.

A functionality of a physical hardware unit or a virtual replicated hardware unit can be a service, for example, which is offered by a corresponding physical hardware unit or a virtual hardware unit. A service comprises, for example, the provision and operation of resources which perform computing operations in accordance with a predetermined specification. A functionality, e.g. that of a fixed disk, can be the provision of program routines which perform a read or write operation. The functionality of the physical hardware unit, namely the fixed disk, is provided and operated by replicating its functionality with the aid of a virtual hardware unit, namely the virtual fixed disk.

During the execution of the predetermined program flow using a virtual hardware unit, an execution behavior is produced as a result of the execution. In this context, a predetermined program flow contains parameters which, during the execution of the program flow, are assigned values that are produced by the program flow. In this context, an execution behavior describes a temporal sequence of parameter assignments. A temporal sequence of parameter assignments is, for example, a sequence of parameter value pairs. The temporal sequence of parameter assignments can be described in a log file, for example, which is updated during the execution of the predetermined program flow.

Furthermore, an execution behavior can be described by a temporal sequence of execution states. Execution states relate to the execution of the program flow and can change during or after the execution of individual execution steps. A program flow can have the execution state not-terminated, for example, signifying that the instruction sequence of the program flow was not fully processed. If the instruction sequence was fully processed, the corresponding execution state of the program flow would be terminated. If a fault in a hardware unit results in a system crash or an indeterminate system state, for example, the execution state of the program flow is considered to be cancelled.

An execution behavior can also be described by a temporal sequence of performance indicators relating to the execution of the individual execution steps. An execution step might have a large number of individual instruction steps, for example. A performance indicator in this context is, for example, the required execution time of the corresponding execution step. If a hardware unit has a fault, it is possible that the functionality of the faulty hardware unit, as required by the execution of the program flow, can only be provided and operated with a time delay. The functionality is therefore provided correctly, but the execution behavior of the hardware unit is characterized by reduced performance indicators. If a storage facility has a fault, for example, the functionality of writing data units to the storage facility as per the specification can only be performed after repeated attempts, thereby resulting in a reduced performance indicator relative to the performance indicator that is derived from the specification of the storage facility.

The difference between an execution behavior of a hardware unit as per its specification and the execution behavior of a hardware unit in the presence of a fault is referred to as execution behavior change, for example.

In order to compare two execution behaviors, it is possible to compare the temporal sequences of parameter assignments during the execution of the program flow, or temporal sequences of execution states and/or temporal sequences of performance indicators that are produced during the execution of the program flow. For this purpose, it is possible e.g. to mark changes in corresponding execution logs (e.g. a log file). By marking the changes of the two execution behaviors, the execution behavior change is then identified.

The execution behavior change is available after the first and the second execution behaviors have been compared. In an additional optional step, the identified execution behavior change is counterbalanced. The counterbalancing step allows a program flow to be executed on a physical computer system in which a physical hardware unit has a fault. By virtue of the counterbalancing step, an execution behavior of a faulty physical computer system can be likened to that of a non-faulty physical computer system. If an execution behavior change has been identified, the program flow can be changed such that it completely counterbalances the execution behavior change. For example, if the execution behavior change consists in a network card inverting received bits, the execution behavior change can be counterbalanced by inverting the inverted received bits a second time, in order to obtain the original error-free bit combination.

A further approach to counterbalancing the execution behavior change consists in changing the functionality of the physical hardware unit. The change in the functionality of the physical hardware unit can be effected, for example, by exchanging a physical hardware unit. However, it is possible to continue using the physical hardware unit if its functionality as per specification has been restored because it has been repaired, for example. For example, a network card which inverts bit strings is repaired in such a way that it outputs the original desired bit combination.

The substeps of the proposed method can be executed at least to some extent in parallel relative to time. This means that, relative to time, a first program flow can be executed in parallel with a second program flow, for example. Moreover, the corresponding execution behaviors need not be available in their entirety in order to be compared subsequently. For example, if an execution behavior is described by a log file, the corresponding log files of the first execution of the program flow and the log file of the second execution of the program flow can already be at least partially compared while the log files are being written.

The replication of the functionality of the physical hardware unit can also comprise emulation or virtualization. In this context, emulation can comprise the partial provision and operation of functionality by the virtual hardware unit, wherein functionality that is not provided can be provided and operated by a physical hardware unit. In this context, virtualization can comprise the full provision and operation of functionality by the virtual hardware unit. The replicated hardware unit is virtually available and is described and/or replicated by a software component and/or by a library, for example. The physical hardware unit is physically (materially) available. Virtual hardware units can be available as emulated hardware units or as virtualized hardware units, for example. A physical computer system is therefore replicated as a virtual computer system, wherein the virtual computer system in turn can consist of a plurality of virtual hardware units. A physical computer system can be a computer, PC, EDP installation, electronic data processing installation, workstation and/or EDP system, for example.

The varying of the functionality of the virtual hardware unit is used to simulate and test a defect in a physical hardware unit. The varying of the functionality of the virtual hardware unit can be effected via an interface entity of the virtual computer system. For example, the physical hardware unit can be replicated by a hypervisor as a virtual hardware unit.

In order to vary the functionality of the virtual hardware unit, the hypervisor can be enhanced to include an interface entity for varying the functionality of the virtual hardware unit. The interface entity is suitable for assigning a predetermined functionality to the virtual hardware unit. This functionality is provided and operated during the subsequent execution of the program flow. It is therefore possible to vary the functionality of the virtual hardware unit while processing the program flow. For example, the failure of a physical hardware unit during the execution of the program flow can be simulated. The interface entity can also be used to vary the functionality of a first virtual hardware unit depending on a functionality of a second virtual hardware unit. It is thus possible to simulate functional dependencies between two physical hardware units. For example, if the motherboard as a physical hardware unit fails on a physical computer system, this implies a failure of all memory devices and computing units plugged into the motherboard. Consequently, the execution behavior of the program flow can be monitored in respect of hardware faults in a plurality of physical hardware units.

In this context, monitoring of the execution behavior of the program flow comprises e.g. capturing, measuring, estimating, logging and/or storing parameter assignments, execution states and/or performance indicators. The varying of functionalities can also take place depending on functionalities of the same hardware unit. For example, if a memory on a graphics card is faulty, it will no longer be possible to perform e.g. computing operations on the graphics card.

According to another embodiment, in a computing installation for analyzing an execution of a predetermined program flow on a physical computer system having a plurality of interacting physical hardware units, the computing installation can have a control entity which executes a method as specified above. In addition, the computing installation can comprise a replicating entity for replicating the functionality of the physical hardware unit, an execution entity for executing the predetermined program flow, a variation entity for varying the functionality of the virtual hardware unit, a monitoring entity for monitoring the execution behavior, and a comparison entity for comparing the execution behavior. The control entity can optionally comprise a counterbalancing entity for counterbalancing the execution behavior changes.

The replicating entity can replicate the functionality of the physical hardware unit as functionality of the virtual hardware units, and can provide and operate the functionality of the physical hardware unit via the functionality of the virtual hardware unit.

The execution entity can execute the predetermined program flow using the functionality of the virtual hardware unit. The use of the functionality of the virtual hardware unit can be performed e.g. in a passive or active manner. For example, a hardware unit can actively execute computing steps. Computing steps are e.g. basic computing operations or value assignments to variables. Passive use includes e.g. the logging of execution behavior. A computing unit can take the form of a processor, microprocessor, computer, computer system, CPU (central processing unit), arithmetic computing unit or circuit.

The variation entity can vary the functionality of the virtual hardware units. The varying comprises e.g. the assignment of functionality to the virtual hardware unit. The manner in which the functionality of the virtual hardware unit is to be varied can be read out from a data store, for example.

The monitoring entity can monitor the execution behavior of the program flow. The comparison entity can determine the execution behavior changes on the basis of the monitored execution behavior.

The counterbalancing entity initiates a counterbalancing of the identified execution behavior changes. This can be a change of the program flow, for example. The replicating entity, the execution entity, the variation entity, the monitoring entity, the comparison entity and/or the counterbalancing entity can be present in physical form, but they can also be present virtually as replicated hardware units, wherein the functionality of the physical hardware unit is at least partially replicated. For example, said entities can be implemented as a computer program part.

According to yet another embodiment, a computer program product may initiate the performance of a method for analyzing an execution of a predetermined program flow on a physical computer system.

Described are therefore a method and a device for analyzing an execution of a predetermined program flow on a physical computer system, whereby extensive, precise and systematic tests of an execution of a predetermined program flow on different computing systems are allowed. In this context, the execution behavior of the program flow can be simulated for different faults in individual virtual hardware units or combinations of faulty individual virtual hardware units. The use of the virtual hardware units makes it possible also to include the operating system of the virtual computer system in the analysis. It is also possible to simulate dependencies between faults in physical hardware units. No costs are incurred for the procurement of faulty hardware units in this context. The replicated virtual hardware units can be stored in a program library, for example, and therefore reused as often as required. They can therefore be replicated at no additional cost. The method and the device according to various embodiments also make it possible to simulate hardware faults at any times during the execution of the program flow. It is therefore possible to analyze extensive and exactly predefined scenarios which contain a fault in a physical hardware unit. Any manual modification of the physical hardware unit or of the physical computer system is avoided in the method according to various embodiments.

Figure 1:
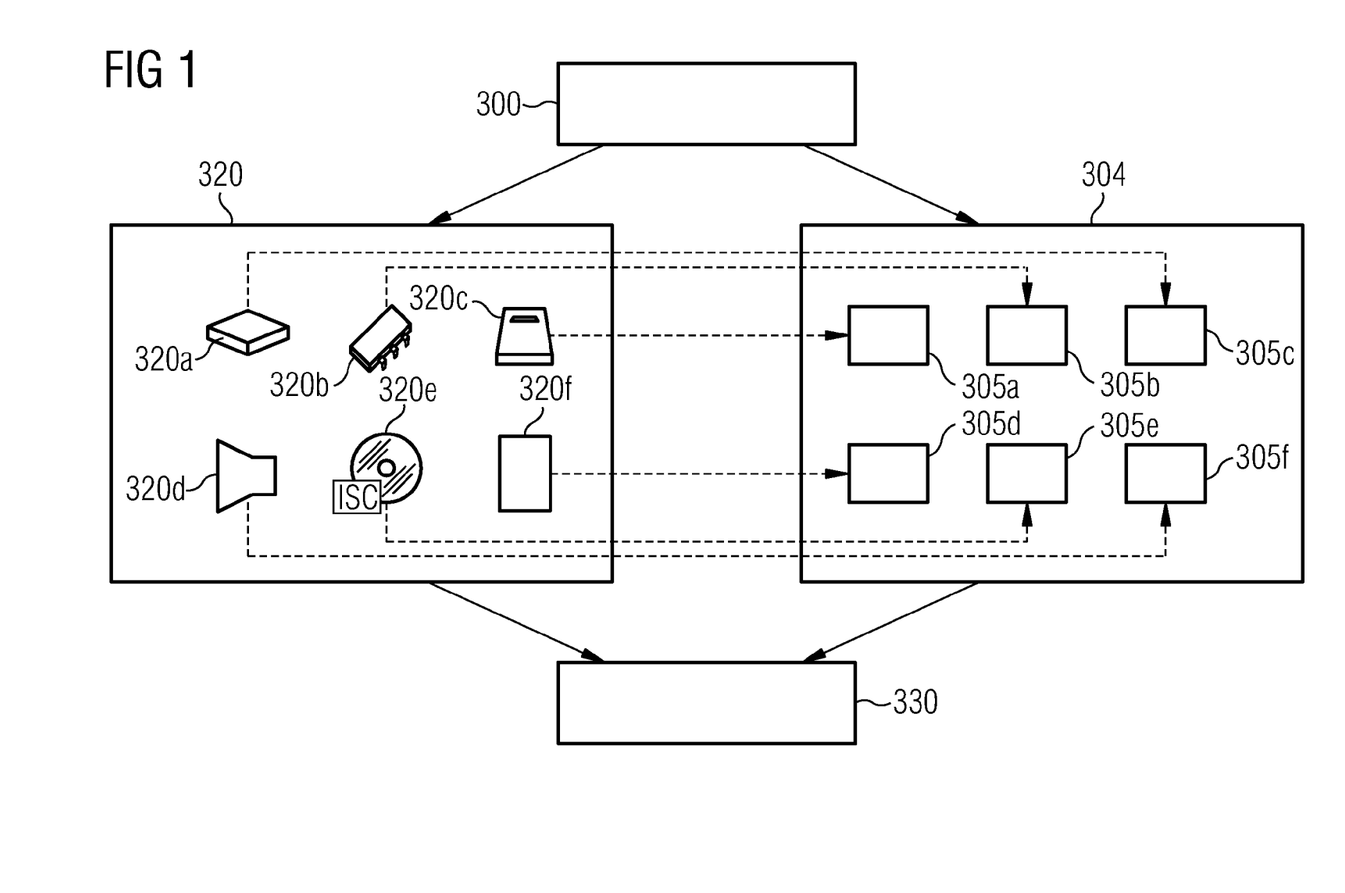
FIG. 1 shows a schematic illustration of a physical computer installation which is replicated as a virtual computer installation.

FIG. 1 shows a schematic illustration of a physical computer system 320 which is replicated as a virtual computer system 304. The physical computer system 320 comprises a plurality of physical hardware units. In the present exemplary embodiment, the physical hardware units comprise a processor 320a, a controller 320b, a fixed disk 320c, a loudspeaker 320d, a CD drive 320e and a graphics card 320f. The physical computer system 320 is suitable for executing a program flow 300 using a selection of the physical hardware units 320a, 320b, 320c, 320d, 320e or 320f.

In this context, a program flow 300 can comprise a software component, for example. A program flow 300 can additionally comprise a test routine, an algorithm, a software program, an instruction sequence and/or a program routine for calculating an output or for providing a service.

In the present exemplary embodiment, the program flow 300 is backup software. Backup software stores existing data units redundantly and persistently at cyclical time intervals. The execution of the backup program 300 results in an execution behavior 330. The execution behavior 330 of the execution of the backup program 300 can be described by a temporal sequence of execution states in individual execution steps of the predetermined program flow 300, by a temporal sequence of performance indicators relating to the execution of individual execution steps and/or by a temporal sequence of parameter assignments which are initiated by the execution of the program flow 300. During the execution of the backup program 300, this backup program 300 actually initiates parameter assignments. For example, the backup program 300 assigns a start time stamp of the backup process to a start parameter and an end time stamp of the backup process to an end parameter.

An execution state can change during or after individual execution steps of the predetermined program flow 300. An execution state can be, for example, not-terminated, terminated, or cancelled. Not-terminated describes the execution state in which the backup program 300 backs up data and processes corresponding instruction sequences for backing up the data. If the instruction sequence for backing up the data is processed successfully, the execution state is terminated. In the event of an indeterminate execution behavior or a program crash, e.g. due to a fault in a hardware unit 320a, 320b, 320c, 320d, 320e or 320f, or if e.g. the available storage capacity of the fixed disk 320c is insufficient to store the data units, the execution state is considered to be cancelled.

A performance indicator describes the non-functional behavior of a physical hardware unit. For example, a performance indicator is the time duration which the physical computer system 320 requires for the purpose of executing the program flow 300. If the backup program 300 is executed, for example, a performance indicator relating to the backup procedure is 30 minutes, which is required by the physical computer system 320 in order to store data units persistently while the backup program 300 is being executed. If a fault occurs in the fixed disk 320c, said fixed disk 320c might only be able to store the data units persistently following a plurality of attempts for example. This results in a reduction of the performance indicator "execution time". A corresponding execution behavior 330 is monitored. The monitoring of the execution behavior 330 can comprise capturing, measuring, estimating, logging and/or storing parameter assignments, execution states and/or performance indicators.

In order to simulate faults in the physical hardware units 320a, 320b, 320c, 320d, 320e, 320f, the physical computer system 320 is replicated as a virtual computer system 304 according to various embodiments. The varying of the functionality of the virtual hardware units 305a, 305b, 305c, 305d, 305e, 305f allows possible faults to be reproduced and systematically analyzed without modification of the physical computer installation 320. The replication is indicated in the present figure by means of broken marked arrows, wherein the relevant physical hardware unit 320a, 320b, 320c, 320d, 320e, 320f is shown at the start of the arrow and the correspondingly mapped virtual hardware unit 305a, 305b, 305c, 305d, 305e, 305f is shown at the end of the arrow. In this context, correctly functioning physical hardware units 320a, 320b, 320c, 320d, 320e, 320f having specification-compliant functionality can be replicated as virtual hardware units 305a, 305b, 305c, 305d, 305e, 305f. However, it is also possible for faulty hardware units having varied functionality to be replicated as virtual hardware units 305a, 305b, 305c, 305d, 305e, 305f. When the program flow 300 is executed by the virtual computer system 304, an execution behavior 330 is produced which is identical to that when the program flow 300 is executed by the physical computer system 320. The identical execution behavior 330 of the physical computer system 320 and the virtual computer system 304 allows conclusions relating to the execution behavior of the program flow 300 on the virtual computer system 304 to be drawn correspondingly in relation to the execution behavior 330 of the program flow on the physical computer system 320.

If the program flow 300 is backup software, for example, the backup software 300 can be executed on the virtual hardware units 305a, 305b, 305c, 305d, 305e, 305f. The virtual hardware units 305a, 305b, 305c, 305d, 305e, 305f provide and operate the functionality as per the physical hardware units 320a, 320b, 320c, 320d, 320e, 320f. This means that data units can be stored on a virtual fixed disk 305c. The virtual computer system 304 acts via a physical computer system 320, which can correspond to the physical computer system 320. This means that the virtual computer system 304 can be replicated on the same physical computer system 320, though the virtual computer system 304 can also be executed or replicated on any other physical computer system which is different to the computer system 320.

Figure 2:
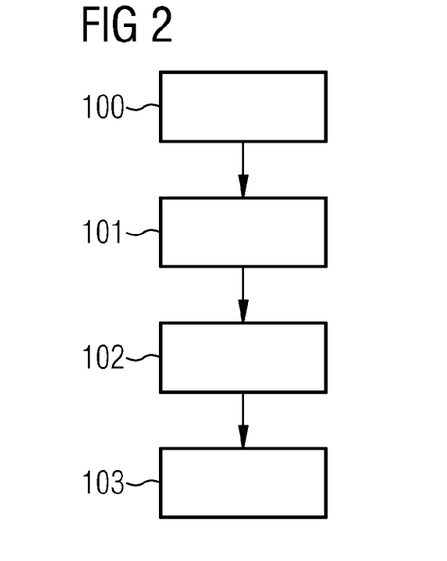
FIG. 2 shows a flow diagram of a variant of a method for analyzing an execution of a predetermined program flow.

FIG. 2 describes a flow diagram for a variant of a method for analyzing an execution of a predetermined program flow on a physical computer system. For this purpose, a predetermined program flow is executed in a first step 100 using a virtual hardware unit with replicated functionality. Corresponding execution behavior of the program flow is monitored in this context. During a second execution of the program flow, the virtual hardware unit is used with varied functionality. The execution of a program flow using a faulty physical hardware unit is therefore simulated in method step 101. In a method step 102, the execution behavior of the first execution of the program flow and the execution behavior of the second execution of the program flow are compared and an execution behavior change is identified thus. On the basis of the identified execution behavior change, counterbalancing of the execution behavior change is performed in the method step 103. This is effected either by changing the program flow or by changing the functionality of the virtual hardware unit that is used.

Figure 3:
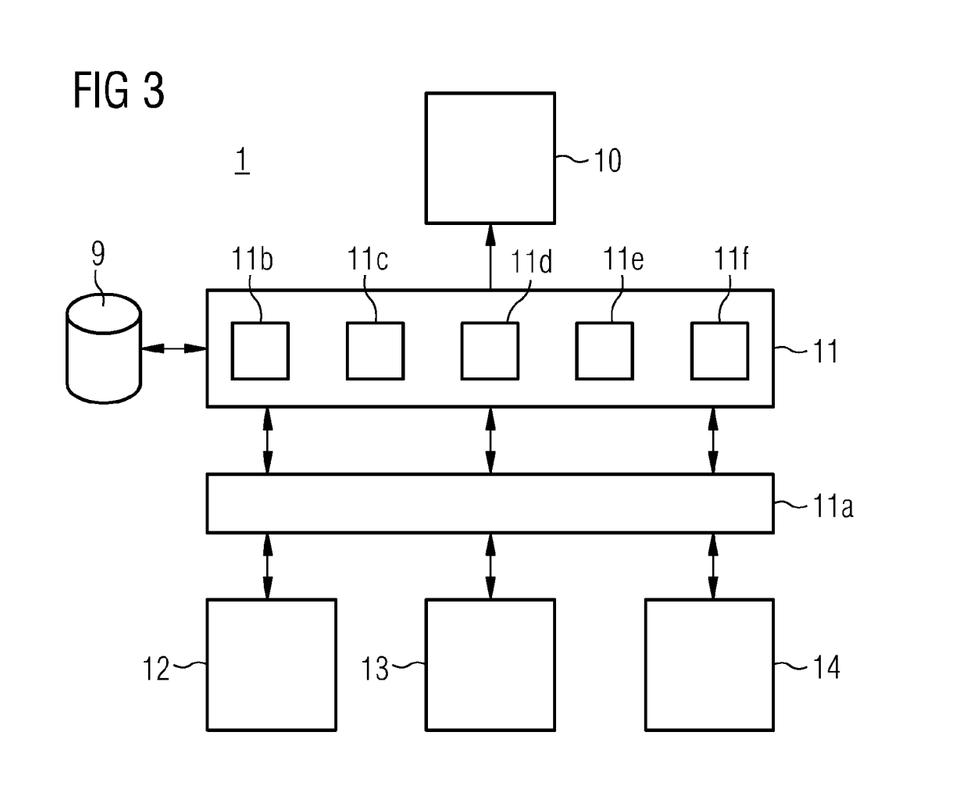
FIG. 3 shows a schematic illustration of a computer installation for analyzing an execution of a predetermined program flow.

FIG. 3 shows a schematic illustration of a computer installation 1 for analyzing an execution of a predetermined program flow on a physical computer system. The steps specified in FIG. 2 can be processed in a corresponding computer system, for example. The computer installation 1 has a control entity 11, which communicates with the replicating entities 12, 13 and 14 via an interface entity 11a. The communication is indicated by dual-headed arrows. For example, a block 12 is a replicating entity for replicating a fixed disk, a block 13 is a replicating entity for replicating a removable storage drive and a block 14 is a replicating entity for replicating a network card. Replicating entities for replicating other physical hardware units are also conceivable in this context. The physical hardware units here are hardware components that are required to operate a physical computer system, and they can be used in a passive or active manner.

In the same way, the use of the virtual hardware units can relate to passive or active use. For example, a virtual hardware unit can actively execute computing steps, e.g.

basic computing operations or value assignments to variables. For example, replication of the functionality of the physical hardware unit, the execution of the program flow and/or the comparison of the execution behavior can be initiated by a virtual hardware unit which is implemented as a computing unit. A computing unit can be embodied as a processor, microprocessor, computer, computer system, CPU (central processing unit), arithmetic computing unit and/or circuit. Passive use comprises e.g. the monitoring of the execution behavior and/or the storage of parameter assignments, execution states and/or performance indicators.

The replication of the physical hardware units by the replicating entities 12, 13 and 14 can be done by a hypervisor, for example. Moreover, the replication can also comprise emulation or virtualization. In this context, emulation can comprise the partial provision of functionality of the virtual hardware unit, wherein functionality that is not provided can be provided by a physical hardware unit. Virtualization here can be the full provision of functionality by the virtual hardware unit. The replicated hardware unit is virtually available and is described and/or replicated by a software component and/or a library, for example. The physical hardware unit is physically (i.e. materially) available.

The replication of the functionality of the physical hardware unit is particularly advantageous if the physical hardware unit is operational and the operation must not be interrupted. If the physical hardware unit offers a service, for example, it can be replicated. Execution behavior can be determined using the replicated, virtual hardware unit. The service that is offered can therefore be offered without interrupting the physical hardware unit. In particular, the replication of hardware units can be performed on the basis of software. For this purpose, execution behavior of the execution of a predetermined program flow can be analyzed in a systematic and reproducible manner without modification of the physical computer system. The functionality of the virtual hardware unit can be varied for this purpose. The varying of the functionality simulates a fault in the corresponding physical hardware in this context.

The functionality of the virtual hardware unit is varied via an interface entity, for example, said interface entity being included in a hypervisor, for example. The varying of the functionality of the virtual hardware unit takes place, for example, depending on a functionality of a further virtual hardware unit. The manner in which corresponding functionalities must be varied and the time at which corresponding functionalities must be varied can be read by the control entity 11 from a data store 9, for example. Furthermore, the data store 9 can be suitable for monitoring resulting execution behavior. The data store 9 can be available as any type of memory, e.g. as a fixed disk, flash disk, CD, DVD, tape and/or removable data media.

In order to execute the method steps described in FIG. 2, the control entity 11 comprises an execution entity 11c for executing the predetermined program flow using the functionality of the virtual hardware unit, a variation entity 11d for varying the functionality of the virtual hardware unit during the execution of the program flow, a monitoring entity 11e for monitoring the execution behavior, a comparison entity 11f for comparing the execution behavior and identifying an execution behavior change, and/or a counterbalancing entity 11b for counterbalancing the execution behavior changes.

In this case, the execution entity 11c executes a predetermined program flow using the functionality of the virtual hardware unit. The program flow is therefore executed by the functionality of the virtual hardware unit, or by the functionalities of the virtual hardware units interacting with the functionality of the other virtual hardware units or, in the case of emulation, by interaction of physical hardware units with the virtual hardware unit. The use includes both active and passive use.

The variation entity 11d varies the functionality of the relevant virtual hardware unit. Said variation comprises, for example, the reading of a variation time point and a new functionality of a virtual hardware unit from a data store 9 and the assignment of the new functionality to a virtual hardware unit.

The monitoring of the execution behavior is carried out by a monitoring entity 11e. The monitoring entity 11e monitors execution behavior of a virtual hardware unit, a selection of virtual hardware units, or the entire virtual computer system. This can also be stored in a respective log file.

On the basis of the monitored execution behavior, the comparison entity 11f determines the execution behavior change of the program flow.

The optional counterbalancing entity 11b analyzes the identified execution behavior change and balances it out. Depending on the execution behavior change concerned, the program flow can be modified e.g. such that the identified execution behavior change no longer occurs if the program flow is executed again. If a disk store exhibits a fault during the execution of a backup program, for example, the counterbalancing device can cause the program flow to be changed such that a different disk store is used, this being independent of the first disk store. Alternatively, the counterbalancing entity 11b can cause the functionality of the virtual hardware unit to be changed. For example, the counterbalancing entity 11b can cause specific parts or sectors of a storage facility to no longer be addressed. Consequently, a hardware fault in a corresponding storage facility is remedied and a corresponding execution behavior change no longer occurs.

The computer installation 1 described in FIG. 3 also comprises an output unit 10, which outputs the execution behavior that was captured by the control entity 11. In this context, an output unit can be a printer, a screen or a device for producing an acoustic signal. As an alternative to the output unit, a device for storing the execution behavior can be provided. Execution behavior changes are likewise output by the output unit 10.

Figure 4:
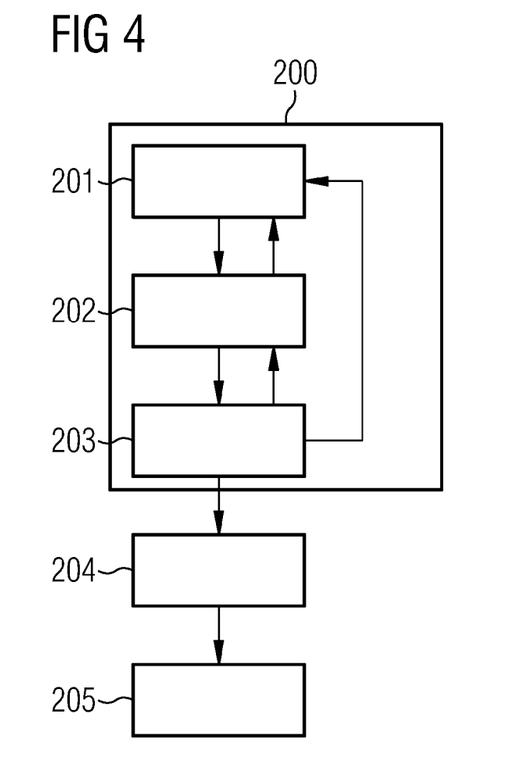
FIG. 4 shows a flow diagram of a further variant of a method for analyzing an execution of a predetermined program flow.

FIG. 4 describes a flow diagram for a variant of a method for analyzing an execution of a predetermined program flow. In a first method step 200, a functionality of a physical hardware unit is replicated as a functionality of a virtual hardware unit. The replicated, virtual hardware unit is used in the method steps 201, 202 and 203, this being graphically illustrated in FIG. 4 using an overall method step 200 by means of a block comprising the method steps 201, 202, 203. The method step 200 comprises the provision of a functionality of a virtual hardware unit, wherein this can be done by emulation or virtualization.

The method step 200 can be performed by a hypervisor, for example. A hypervisor can be VMWare, for example. A hypervisor can comprise a replicating entity, e.g. the replicating entity 12 as described in FIG. 3 for replicating a fixed disk, the replicating entity 13 for replicating a removable storage drive and/or the replicating entity 14 for replicating a network card.

Emulation can comprise the partial provision of functionality by the virtual hardware unit, wherein functionality that is not provided can be provided by a physical hardware unit.

For example, in the case of an emulation, these accesses to a first data record of a fixed disk can be executed by a virtual hardware unit, and write access to a second data record of the fixed disk can be executed by a physical hardware unit. Virtualization in this context can describe the full provision of functionality by the virtual hardware unit.

In the case of virtualization of a physical fixed disk, for example, the functionality of the physical fixed disk, e.g. the reading and writing of the data records, is executed by a virtual fixed disk. A virtual fixed disk here is a virtual hardware unit which provides the functionality of a physical fixed disk by means of emulation or virtualization. The functionality of the virtual hardware unit can be provided e.g. in conjunction with a physical hardware unit. Likewise, a physical fixed disk can also provide storage capacity for a plurality of virtual fixed disks. Even in the case of a full replication of the functionality of the physical fixed disk, e.g. write or read operations, a virtual fixed disk therefore needs physical storage in order that a storage capacity corresponding to the available physical storage capacity can be provided for an operating parameter.

For example, it may be the case that no identical operating parameter and/or functionality of a physical hardware unit is available for an operating parameter and/or a functionality of a virtual hardware unit. The hardware unit would then be purely virtual. There is then no corresponding physical hardware unit for the virtual hardware unit.

Replication of a functionality of a physical hardware unit can therefore comprise the provision and operation of a functionality of a virtual hardware unit according to the functionality of the respective physical hardware unit.

In a method step 201, a predetermined program flow is executed using the functionality of the virtual hardware unit. In addition to the virtual hardware unit, other virtual or physical hardware units can also be involved in the execution. The program flow here can comprise a test routine, an algorithm, a software program, an instruction sequence and/or a program routine.

In a method step 202, the functionality of a virtual hardware unit is varied, thereby simulating a fault in a physical hardware unit. This can be done depending on another functionality of a virtual hardware unit. For example, if the functionality of a motherboard fails, the failure of the computing units and/or memory unit plugged into the motherboard can therefore also be simulated.

Corresponding execution behaviors are monitored in a method step 203. The monitoring of the execution behaviors can involve capturing, measuring, estimating, logging and/or storing parameter assignments, execution states and/or performance indicators. For this purpose, a program is executed using the functionality of the virtual hardware unit, for example, and a resulting execution behavior is measured or estimated e.g. by means of a statistical method. The measurement here comprises any type of observation, comparison, digital or analog capture of execution behavior. The estimation here comprises any type of projection, interpolation, extrapolation and/or inference or deduction. A predetermined quantity of information might be present as a precondition for estimation, representing experimental values of execution behavior or previously monitored execution behavior.

The method steps 201, 202 and 203 can be executed at least to some extent in parallel relative to time. Multiple executions of a program flow can therefore run in parallel, for example, or one execution of a program flow can run using a functionality according to the respective specification, and one execution of a program flow using a varied functionality of a virtual hardware unit. The monitoring can run in parallel with the execution of program flows. After corresponding execution behaviors have been monitored, these execution behaviors are compared in step 204 and an execution behavior change identified thus. This can be done by comparing two log files, for example.

In an optional method step 205, the identified execution behavior change is counterbalanced. Counterbalancing of the execution behavior change can be done, for example, by changing the program flow or by changing the functionality of the virtual hardware unit that is used.

For example, a backup program is executed in method step 201. To this end, necessary virtual hardware units are created by replicating the physical hardware units in method step 200. A first execution of the backup program, which is monitored in method step 203, returns a first execution behavior. A fault in a physical fixed disk is then simulated, and the functionality of the virtual fixed disk is varied correspondingly for this purpose in step 202. An execution in method step 201 returns a second execution behavior as a function of the varied functionality of the virtual hardware unit. It may be that an execution is not possible due to a total failure of the fixed disk, for example, and the execution state is therefore cancelled. In a method step 204, a first and a second execution behavior are compared and an execution behavior change is identified thus. As part of this activity, for example, it is noted that a second execution of the program flow was cancelled. In a method step 205, the execution of the backup program is varied such that, for example, the backup program accesses a different independent fixed disk store. Alternatively, replacement of the faulty fixed disk is initiated.

Figure 5:
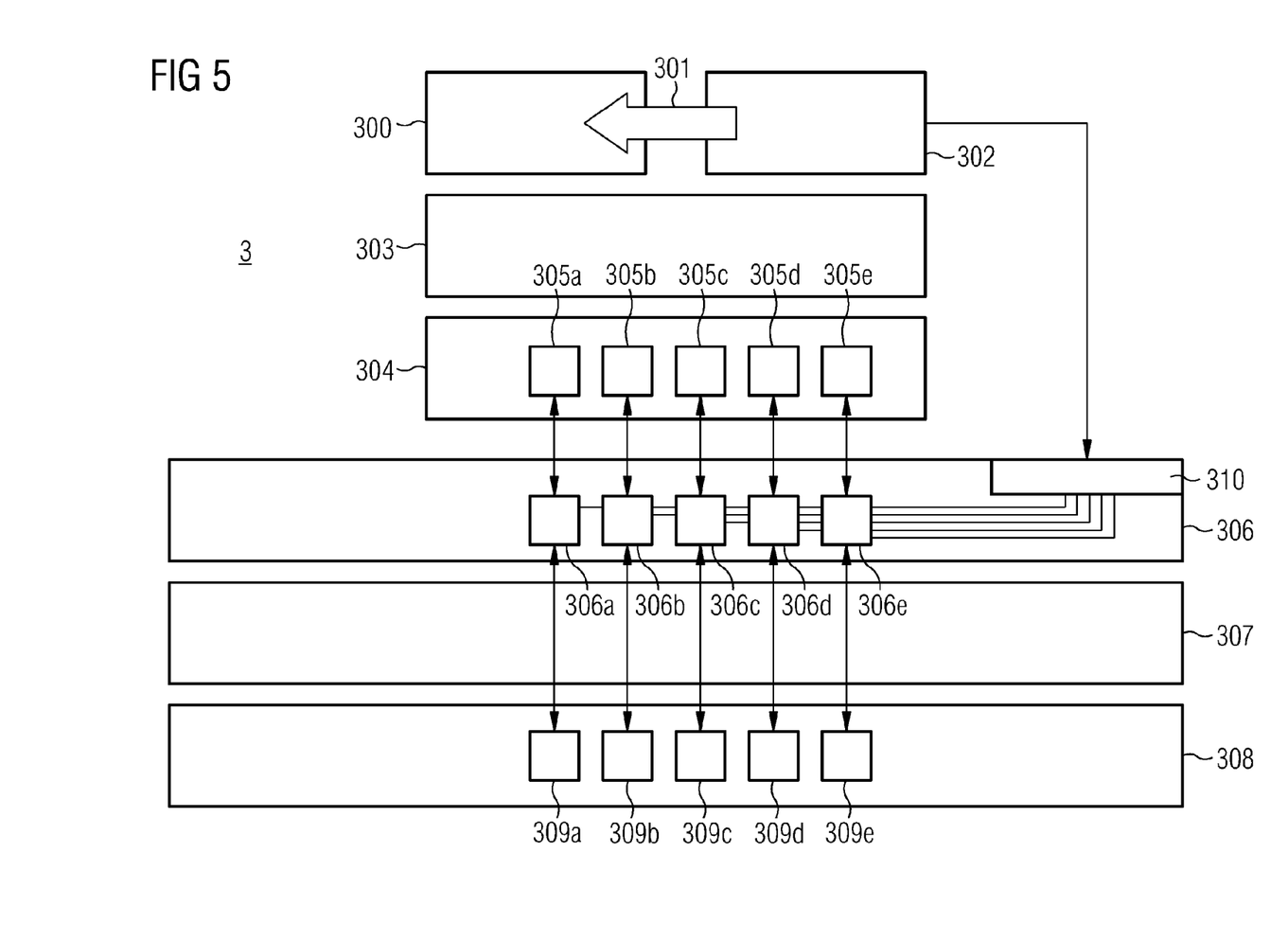
FIG. 5 shows a schematic illustration of a further computer installation for analyzing an execution of a predetermined program flow.

FIG. 5 shows a schematic illustration of a computer installation 3 for analyzing an execution of a predetermined program flow 300 on a physical computer system 308. For this purpose, a predetermined program flow 300 is tested by a test program 302 in an implementation of a test 301 in respect of the execution behavior of the predetermined program flow 300, using a functionality of a virtual hardware unit 305*a*, 305*b*, 305*c*, 305*d* and/or 305*e*. Alternatively, the test program 302 can also be referred to as a "test driver". Both the program flow 300 and the test program 302 access a virtual computer system 304 via a "guest operating system" 303. The virtual computer system 304 comprises the virtual hardware units 305*a*, 305*b*, 305*c*, 305*d* and 305*e*. The virtual hardware units 305*a*, 305*b*, 305*c*, 305*d* and 305*e* are provided in each case by replicating entities 306*a*, 306*b*, 306*c*, 306*d* and 306*e*, which can be included in a replicating device 306. The replicating entities 306*a*, 306*b*, 306*c*, 306*d* and 306*e* respectively replicate a physical hardware unit 309*a*, 309*b*, 309*c*, 309*d* and 309*e* as a virtual hardware unit 305*a*, 305*b*, 305*c*, 305*d* and 305*e*.

The quantity of virtual hardware units 305*a*, 305*b*, 305*c*, 305*d*, 305*e* included in a virtual computer system 304 can be unequal to the quantity of physical hardware units 309*a*, 309*b*, 309*c*, 309*d*, 309*e* in the replicated, physical computer system 308. For example, a virtual computer system 304 can include a plurality of virtual hardware units 305*a*, 305*b*, 305*c*, 305*d*, 305*e*, which are operated by a single physical hardware unit 309*a*, 309*b*, 309*c*, 309*d*, 309*e*. A replication of a physical hardware unit 309*a*, 309*b*, 309*c*, 309*d*, 309*e* does not necessarily represent a bijection between physical hardware units 309*a*, 309*b*, 309*c*, 309*d*, 309*e* and virtual hardware units 305*a*, 305*b*, 305*c*, 305*d*, 305*e*, but can also be an n:m function. In this context, n and m are always natural numbers which designate the quantity of respective hardware units.

The replicating entities 306a, 306b, 306c, 306d and 306e can have a "fault simulation control" which varies the functionality of the virtual hardware unit 305a, 305b, 305c, 305d and 305e in such a way that a fault in a physical hardware unit 309a, 309b, 309c, 309d, 309e is replicated. A "fault simulation control" can correspond, for example, to a variation entity 11d as described in FIG. 3. Fault simulation control entities can be activated via the interface entity 310. The physical hardware units 309a, 309b, 309c, 309d, 309e can take the form of a network card, removable storage drive, fixed disk, memory module, processor or microprocessor, for example.

The functionality of the virtual hardware unit 305a, 305b, 305c, 305d, 305e can be assigned or varied by the test program 302 via an interface entity 310. The test program 302 initiates the execution of the program flow 300 for each test 301, and monitors the execution behaviors that are produced by the program flow 300 and the varied functionality of the virtual hardware unit 305a, 305b, 305c, 305d, 305e. Execution behaviors are recorded in a log file by the test program 302.

The replicating device 306 with its assigned replicating entities 306a, 306b, 306c, 306d and 306e accesses the physical computer system 308 via the "host operating system" 307, this being indicated by means of bidirectional arrows in FIG. 5. "Guest operating system" 303 and "host operating system" 307 can take the form of a version of Windows or a version of Linux, for example. The physical computer system 308 features the physical hardware units 309a, 309b, 309c, 309d and 309e.

In an alternative embodiment, the replicating entities 306a, 306b, 306c, 306d and 306e can replicate physical hardware units which differ in terms of operating parameters and functionality from the physical hardware units 309a, 309b, 309c, 309d and 309e, and therefore replicate a physical computer system which does not correspond to the physical computer system 308. A possible application scenario of the computer installation 3 described in FIG. 5 is testing the effects in faulty hardware units of a physical computer system 308. In this context, the replication of the physical hardware units 309a, 309b, 309c, 309d and 309e is not executed on the physical computer system 308, for example. Only the hardware units of the physical computer system 308 are replicated. For this purpose, the physical computer system 308 is replicated as a virtual computer system 304. Corresponding physical hardware units 309a, 309b, 309c, 309d and 309e are replicated via corresponding replicating entities 306a, 306b, 306c, 306d and 306e as virtual hardware units 305a, 305b, 305c, 305d and 305e. The program flow 300 is executed in a test 301 by a corresponding test program 302 using an unvaried functionality of the hardware unit, and a second time using a varied functionality of the hardware unit used. The varying of the functionality of the hardware unit 305a, 305b, 305c, 305d and 305e is coordinated by the replicating entity 306a, 306b, 306c, 306d and 306e via the corresponding interface entity 310. For example, the method steps that are illustrated and explained in FIG. 4 are implemented by the entities of the computer installation 3.

The program flow 300 is an office program, for example. A physical hardware unit 309a which represents a physical fixed disk is replicated by a corresponding replicating entity 306a as virtual fixed disk 305a. The office program 300 is now executed on a virtual operating system 303 using the virtual hardware unit 305a, namely the virtual fixed disk. This results in a specific execution behavior. In a second execution of the office program 300, for example, a faulty physical hardware unit 309a is used, namely a faulty fixed disk. For this purpose, the functionality of the virtual fixed disk 305a is varied via a corresponding interface device 310 and a corresponding replicating device 306a. The varying of the functionality simulates the faulty functionality of the hardware unit 309a. The test program 302 also initiates a comparison between the execution behavior of the first execution and the execution behavior of the second execution. An execution behavior change, which is produced by a fault in the virtual fixed disk, is identified thereby. In subsequent steps, the test program 302 can systematically simulate all possible faults in the virtual fixed disk 305a and all possible faults in the further hardware units 305b, 305c, 305d and 305e. In particular, all combinations of the possible faults can be simulated and analyzed accordingly.

A corresponding physical computer system 308 does not require manual modification for this purpose. In particular, the operation of the physical computer system 308 is neither restricted nor interrupted. The proposed method and computer installations are also advantageous in that a corresponding program flow 300, e.g. the office program 300, was executed using any desired operating system 303 or "guest operating system".

It is advantageous in this context that execution behavior changes can be determined by means of an operating system 303, without using expensive physical hardware components 309a, 309b, 309c, 309d, 309e and without modifications to a physical computer system 308.

A program flow 300 can be executed as often as required using the virtual hardware unit 305a, 305b, 305c, 305d and/or 305e. In this context, the functionality of the virtual hardware unit 305a, 305b, 305c, 305d and/or 305e can be varied in each case before and/or during the execution of the program flow.

What is claimed is:

1. A method for analyzing a predetermined program flow including a plurality of execution steps on a physical computer system operable to execute the predetermined program flow, the system including a plurality of interacting physical hardware units, the method comprising the following steps:

generating, by a hypervisor, a virtual hardware unit corresponding with a physical hardware unit of the physical computer system;

replicating, by the hypervisor, a computing service provided by the physical hardware unit as a computing service provided by the virtual hardware unit in order to develop at least part of a virtual computer system which corresponds to the physical computer system;

executing the predetermined program flow a first time using the replicated computing services of the virtual hardware unit, and monitoring a first execution behavior of the virtual hardware unit, wherein execution of the replicated computing services of the virtual hardware unit simulates a non-defective operation of the physical hardware unit;

varying, by the hypervisor, the replicated computing service to provide a varied computing service of the virtual hardware unit, the varied computing service simulating a defect in the physical hardware unit;

executing the predetermined program flow a second time using the varied computing service of the virtual hardware unit, and monitoring a second execution behavior of the virtual hardware unit, wherein execution of the varied computing services of the virtual hardware unit simulates a defective operation of the physical hardware unit;

identifying an execution behavior change by comparing the first execution behavior of the virtual hardware unit with the second execution behavior of the virtual hardware unit; and based on the identified execution behavior change of the virtual hardware unit, changing the program flow for subsequent execution on the physical hardware unit to avoid the simulated defective operation of the physical hardware unit.

2. The method according to claim 1, wherein a further step is performed: varying the functionality of the virtual hardware unit.

3. The method according to claim 1, wherein the program flow is changed in order to counterbalance the identified execution behavior.

4. The method according to claim 1, wherein the functionality of the physical hardware unit is changed in order to counterbalance the identified execution behavior when executing the program flow using the physical hardware unit.

5. The method according to claim 1, wherein at least one of the program flow and the functionality of the physical hardware unit is changed such that the first execution behavior and the second execution behavior are identical.

6. The method according to claim 1, wherein an execution behavior is described by a temporal sequence of parameter assignments which are initiated by the execution of the program flow.

7. The method according to claim 1, wherein an execution behavior is described by a temporal sequence of execution states in individual execution steps of the predetermined program flow, wherein a respective execution state is not-terminated, terminated or cancelled, wherein the execution state is not-terminated during the execution of the program flow, is terminated after execution of the program flow, and is cancelled in the case of an unpredictable cancellation of the execution of the program flow.

8. The method according to claim 1, wherein an execution behavior is described by a temporal sequence of performance indicators relating to the execution of individual execution steps of the predetermined program flow.

9. The method according to claim 1, wherein at least two of the steps are executed at least in part in parallel.

10. The method according to claim 1, wherein the replication of the functionality of the physical hardware unit comprises virtualization.

11. The method according to claim 1, wherein the replication of the functionality of the physical hardware unit comprises emulation.

12. The method according to claim 1, wherein the varying of the functionality of the virtual hardware unit is done by means of an interface entity of the virtual computer system.

13. The method according to claim 1, wherein the varying of a functionality of a first virtual hardware unit takes place depending on a functionality of a second virtual hardware unit.

14. The method according to claim 1, wherein the monitoring of the execution behavior of the virtual hardware unit comprises at least one of capturing, measuring, estimating, logging, and storing at least one of parameter assignments, execution states and performance indicators.

15. The method according to claim 1, wherein the predetermined program flow comprises at least one of a test routine, algorithm, software program, instruction sequence and program routine.

16. A computer installation for analyzing a predetermined program flow including a plurality of execution steps on a physical computer system including a physical hardware unit which interacts with at least one further physical hardware unit, comprising:

computer instructions stored in non-transitory computer-readable media, and a processor configured to execute the computer instructions to:

generate, using a hypervisor, a virtual hardware unit corresponding with the physical hardware unit;

replicate, using the hypervisor, a computing service provided by the physical hardware unit as a computing service provided by the virtual hardware unit, execute the predetermined program flow a first time using the replicated computing service of the virtual hardware unit, and monitoring a first execution behavior of the virtual hardware unit, wherein execution of the replicated computing services of the virtual hardware unit simulates a non-defective operation of the physical hardware unit, vary, using the hypervisor, the computing service of the virtual hardware unit to provide a varied computing service of the virtual hardware unit that simulates a defect in the physical hardware unit, execute the predetermined program flow a second time using the varied computing service of the virtual hardware unit, and monitoring a second execution behavior of the virtual hardware unit, wherein execution of the varied computing services of the virtual hardware unit simulates a defective operation of the physical hardware unit, identify an execution behavior change by comparing the execution behaviors of the virtual hardware unit, and based on the identified execution behavior change of the virtual hardware unit, change the program flow for subsequent execution on the physical hardware unit to avoid the simulated defective operation of the physical hardware unit.

17. The computer installation according to claim 16, wherein the control entity is suitable for counterbalancing the execution behavior which was identified by comparing the execution behaviors.

18. The computer installation according to claim 16, wherein the control entity comprises at least one of: at least one replicating entity for replicating the functionality of the physical hardware unit, at least one execution entity for executing the predetermined program flow using the functionality of the virtual hardware unit, at least one variation entity for varying the functionality of the virtual hardware unit during the program flow, at least one monitoring entity for monitoring execution behaviors, at least one comparison entity for comparing the execution behaviors and at least one counterbalancing entity for counterbalancing the identified execution behavior.

19. The computer installation according to claim 16, wherein the computer installation is further configured to replicate a functionality of a physical hardware unit as functionality of a virtual hardware unit in order to develop at least part of a virtual computer system which corresponds to the physical computer system;

to execute the program flow a first time using the replicated functionality of the virtual hardware unit, and monitoring a first execution behavior of the virtual hardware unit;

to execute the program flow a second time using a varied functionality of the virtual hardware unit, and monitoring a second execution behavior of the virtual hardware unit; and to compare the first execution behavior with the second execution behavior in order to identify an execution behavior of a hardware unit in the presence of a fault.

20. The computer installation according to claim 16, wherein the variation entity varies the functionality of the virtual hardware unit via the interface entity during the execution of the program flow.

21. The computer installation according to claim 16, wherein the replicating entity, the execution entity, the variation entity, the monitoring entity and the comparison entity are implemented at least partially as a computer program.

22. A computer program product comprising a non-transitory machine-readable storage medium storing instructions, which when executed on a computer installation for analyzing a predetermined program flow using a physical computer system including a physical hardware unit which interacts with at least one further physical hardware unit, the computer installation comprising a control entity operable to replicate the functionality of the physical hardware unit as a functionality of a virtual hardware unit, to vary a functionality of the virtual hardware unit, to monitor execution behaviors, to compare the execution behaviors, and perform the steps of:

generating, using a hypervisor, a virtual hardware unit corresponding with a physical hardware unit of the physical computer system;

replicating, using the hypervisor, a computing service provided by the physical hardware unit as a computing service provided by the virtual hardware unit in order to develop at least part of a virtual computer system which corresponds to the physical computer system;

executing the predetermined program flow a first time using the replicated computing services of the virtual hardware unit, and monitoring a first execution behavior of the virtual hardware unit, wherein execution of the replicated computing services of the virtual hardware unit simulates a non-defective operation of the physical hardware unit;

varying, by the hypervisor, the replicated computing service to provide a varied computing service of the virtual hardware unit, the varied computing service simulating a defect in the physical hardware unit;

executing the predetermined program flow a second time using the varied computing service of the virtual hardware unit, and monitoring a second execution behavior of the virtual hardware unit, wherein execution of the varied computing services of the virtual hardware unit simulates a defective operation of the physical hardware unit;

identifying an execution behavior change by comparing the first execution behavior of the virtual hardware unit with the second execution behavior of the virtual hardware unit; and based on the identified execution behavior change of the virtual hardware unit, changing the program flow for subsequent execution on the physical hardware unit to avoid the simulated defective operation of the physical hardware unit.

* * * * *